Oct. 19, 1926.
W. M. EPTON
ROPE SUPPORTING ROLLER
Filed March 22, 1926
1,603,671
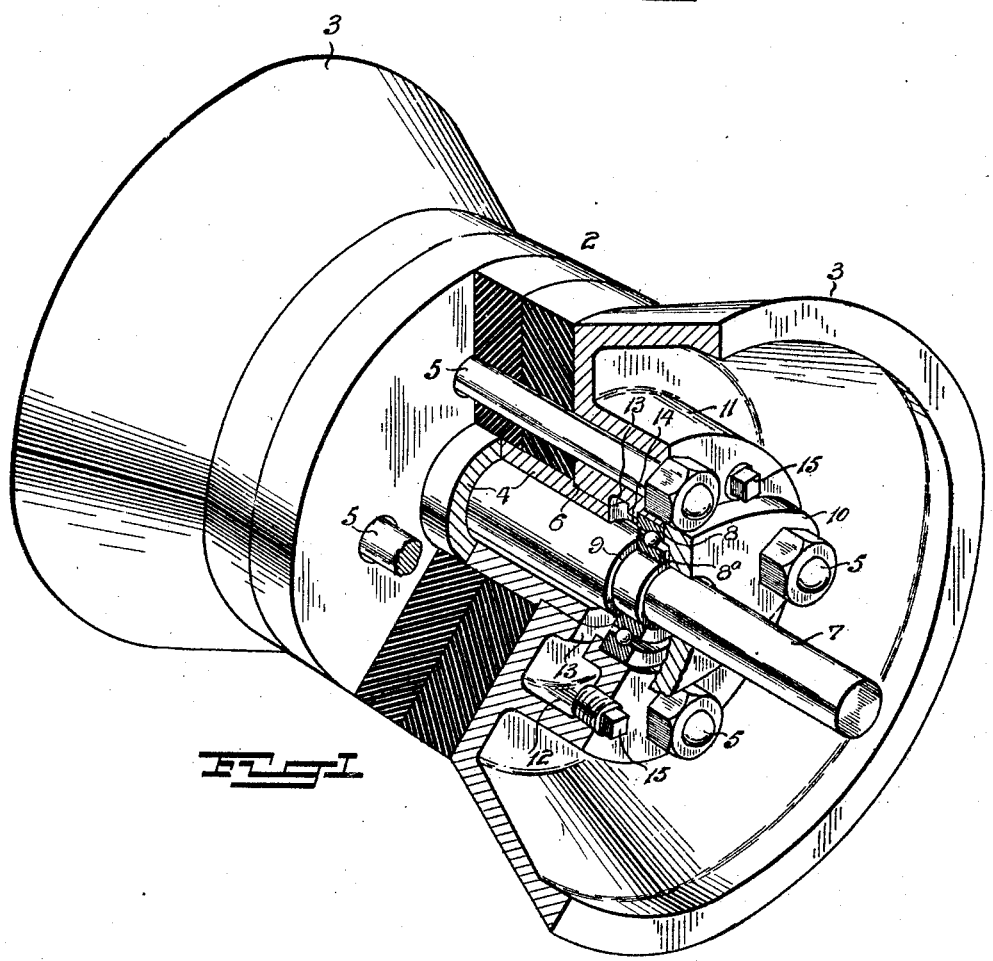
Inventor:
William Martin Epton
By
Attorney.

Patented Oct. 19, 1926.

1,603,671

UNITED STATES PATENT OFFICE.

WILLIAM MARTIN EPTON, OF JOHANNESBURG, TRANSVAAL, SOUTH AFRICA.

ROPE-SUPPORTING ROLLER.

Application filed March 22, 1926, Serial No. 96,583, and in South Africa December 5, 1924.

The present invention refers to rope supporting rollers having a tread portion which is structurally separate from the body of the roller; and especially to rope supporting rollers having a tread of material such as rubber which is specially resistant to damage by the rope and in its turn does not damage the rope.

An object of the invention is to provide a roller which effectively supports and retains the rope whilst having a limited extent of the expensive tread material. A further object is to provide the roller with a bearing construction which minimizes slip between the rope and the tread. Another object is to provide for the effective lubrication of the bearing.

The invention is illustrated in the accompanying drawing in which—

Fig. I is a perspective view showing half the length of the roller in section.

Fig. II shows a modification.

The barrel of a roller according to this invention comprises a substantially cylindrical tread portion 2 occupying considerably less than the length of the barrel, and end cheeks 3 which extend the barrel to the normal or desired length and are fast with the tread. The tread portion may conveniently be about one third the length of the barrel. The cheeks 3 can engage the rope but are not intended to support the same continuously; they are of conical form with the larger ends outwards so that when the rope comes into contact with them they lead it back onto the tread 2.

It is preferred to mount the tread and the cheeks upon a common sleeve 4 which rotates with them, and to secure the cheeks and tread together by bolts 5, 5, 5, 5, extending through them.

The tread is made of rubber of such radial thickness as to resist crushing by the impacts of the rope. With this object the thickness is usually more than half the radius of the tread; and it is preferred to make the tread outside the sleeve wholly of rubber as shown. Preferably also the rubber is in the form of separate discs which are compressed longitudinally by the tightening of the bolts 5, the sleeve 4 having, at its ends, the shoulders 6 against which the cheeks abut when the bolts 5 are tightened, thus ensuring that the rubber discs are compressed to the proper extent.

In the modification shown in Fig. II, the end cheeks stand above the tread 2. Two thin rubber discs $2^a$, of the same diameter as the inner ends of the conical cheek surfaces are provided at the ends of the tread to protect the cheeks from being cut by the rope in case the latter tends to run to the end of the tread.

The cheeks 3 are conveniently made of light alloy with thin conical portions, thus reducing the moment of momentum of the barrel as a whole. This has the important effect of enabling the barrel readily to start and stop with the rope, reducing slipping between the tread and the rope and securing a long life for the tread.

With the same object a stationary spindle 7 is employed and the roller is carried thereon by means of ball or roller bearings 8, $8^a$.

The outer races 8 of the ball bearings are fitted into recesses in the cheeks. The inner races $8^a$ are pressed onto the spindle 7 and against the shoulders 9 thereon to position the barrel on the spindle. The bearing is enclosed and its outer race clamped in place by a gland-like cap 10 which may be secured by two of the bolts 5.

The only fitting necessary to put the roller into use is to fix the projecting ends of the spindle 7 to any convenient supports, such as wooden blocks. The contained bearings ensure a low and uniform resistance to rotation which is an important factor in prolonging the life of the tread.

The roller is provided with lubricant reservoirs, one at each end of the barrel and consisting of several chambers 12, formed in the cheek bosses 11 between the bolts 5. Said chambers are separated from one another by the metal around the bolts 5, so tending to keep the lubricant from collecting in one spot and throwing the roller out of balance.

The several chambers at each end of the roller are, however, connected by the annular groove 13 which is formed in the boss 11 around the spindle 7. Said groove 13 is extended at 14 to convey the lubricant to the bearing 8. Lubricant is supplied to the reservoir from time to time through openings fitted with plugs or the like 15.

I claim:—

1. In a rope supporting roller, the combination of a barrel comprising a shouldered sleeve, a number of rubber discs mounted on said sleeve and forming the tread, conical end cheeks mounted on the sleeve, bolts extending through the discs and cheeks and holding the latter to the shoulders of the sleeve and thereby compressing the tread, and a fixed spindle on which the sleeve is rotatably mounted.

2. A rope supporting roller comprising a sleeve, tread-forming discs on said sleeve, end cheeks mounted on the sleeve, means whereby the end cheeks hold the discs in longitudinal compression, a spindle extending through the sleeve and adapted to be fixedly supported, anti-friction bearings between the spindle and each end cheek, each bearing comprising an inner race on the spindle, an outer race in each end cheek, interposed rotary elements and enclosing caps, and bolts extending through the discs and cheeks to hold them in longitudinal compression, some of said bolts securing the caps against the outer races.

3. A rope supporting roller according to claim 2, in which each of said cheeks is formed with a lubricant reservoir, each reservoir consisting of a plurality of separate chambers, and a common passage connecting the chambers and arranged to pass lubricant to the bearing.

In testimony whereof I affix my signature.

WILLIAM MARTIN EPTON.